United States Patent
Dai et al.

(10) Patent No.: US 8,582,605 B2
(45) Date of Patent: Nov. 12, 2013

(54) METHOD AND DEVICE FOR MAPPING THE INITIAL LOCATION OF DOWNLINK PILOT

(75) Inventors: Bo Dai, Shenzhen (CN); Shuqiang Xia, Shenzhen (CN); Guanghui Yu, Shenzhen (CN); Peng Hao, Shenzhen (CN); Chunli Liang, Shenzhen (CN)

(73) Assignee: ZTE Corporation, Shenz, Guangdong Province (CN)

( * ) Notice: Subject to any disclaimer, the term of this patent is extended or adjusted under 35 U.S.C. 154(b) by 477 days.

(21) Appl. No.: 12/865,079

(22) PCT Filed: Jul. 4, 2008

(86) PCT No.: PCT/CN2008/071554
§ 371 (c)(1),
(2), (4) Date: Jul. 28, 2010

(87) PCT Pub. No.: WO2009/100630
PCT Pub. Date: Aug. 20, 2009

(65) Prior Publication Data
US 2011/0002317 A1 Jan. 6, 2011

(30) Foreign Application Priority Data
Feb. 1, 2008 (CN) .......................... 2008 1 0008660

(51) Int. Cl.
*H04J 1/16* (2006.01)
(52) U.S. Cl.
USPC ............................ 370/491; 370/338; 375/260
(58) Field of Classification Search
USPC ......... 370/208–209, 252–253, 311, 329–338, 370/465–479; 375/260
See application file for complete search history.

(56) References Cited

U.S. PATENT DOCUMENTS

| 2006/0133381 A1 | 6/2006 | Wang |
| 2007/0202816 A1 | 8/2007 | Zheng |

(Continued)

FOREIGN PATENT DOCUMENTS

| CN | 1722896 A | 1/2006 |
| CN | 101064701 A | 10/2007 |

(Continued)

OTHER PUBLICATIONS

Alcatel-Lucent, "The Reduced-Latency DL RS for FDD E-UTRA Compared With the Modified Working Assumption", "3GPP RAN1#48bis, 3GPP RAN2#57bis, 3GPP RAN3#55bis Meeting in St. Julian's, Malta", Mar. 26-30, 2007, pp. 1-12, 3rd Generation Partnership Project.

(Continued)

*Primary Examiner* — Ricky Ngo
*Assistant Examiner* — Iqbal Zaidi
(74) *Attorney, Agent, or Firm* — Hultquist, PLLC; Steven J. Hultquist; Mary B. Grant

(57) ABSTRACT

A mapping method for the initial location of the downlink pilot comprises the following steps: acquiring a cell sequence number; mapping the cell sequence number to k; and setting an initial location of a downlink pilot on a first antenna as the $K^{th}$ sub-carrier. A mapping device for the initial location of the downlink pilot comprising: an acquiring module for acquiring a cell sequence number, a mapping module for mapping the cell sequence number to k and a setting module for setting an initial location of a downlink pilot on a first antenna as the $K^{th}$ sub-carrier. The mapping method and the mapping device make each cell acquire the specific location of pilot, so that all functions of the system can be realized conveniently.

2 Claims, 3 Drawing Sheets

(56) References Cited

U.S. PATENT DOCUMENTS

2008/0165710 A1* 7/2008 Parts et al. .................... 370/280
2011/0243190 A1* 10/2011 Nagata et al. ................. 375/133

FOREIGN PATENT DOCUMENTS

| EP | 2139135 A1 | 12/2009 |
| JP | 2005-53198 A | 3/2005 |
| JP | 2006-1672 A | 1/2006 |
| WO | 2005053198 A2 | 6/2005 |
| WO | 2005053198 A3 | 6/2005 |
| WO | WO2005053198 * | 6/2005 |
| WO | WO 2005053198 A2 * | 6/2005 |

OTHER PUBLICATIONS

NTT Docomo, et al, "Frequency Hopping/Shifting of Downlink Reference Signal in E-UTRA", "3GPP TSG RAN WG1 Meeting #49, Kobe, Japan", May 7-11, 2007, pp. 1-3, 3rd Generation Partnership Project.

NTT Docomo, et al., "Frequency Hopping/Shifting of Downlink Reference Signal in E-UTRA", "3GPP TEG RAN WG1 Meeting #48bis, St. Julian's, Malta", Mar. 26-30, 2007, pp. 1-3, 3rd Generation Partnership Project.

* cited by examiner

METHOD AND DEVICE FOR MAPPING THE INITIAL LOCATION OF DOWNLINK PILOT

CROSS-REFERENCE TO RELATED APPLICATIONS

This application is a U.S. national phase application under the provisions of 35 U.S.C. §371 of International Application No. PCT/CN08/71554 filed on Jul. 4, 2008, which in turn claims priority of Chinese Patent Application No. 200810008660.9 filed on Feb. 1, 2008. The disclosures of such international application and Chinese priority application are hereby incorporated herein by reference in their respective entireties, for all purposes.

FIELD OF THE INVENTION

The present invention relates to communication field, in particular to a method and device for mapping the initial location of downlink pilot.

BACKGROUND OF THE INVENTION

FIG. 1 is the schematic diagram of the frame structure of the Long Term Evolution (LTE) system. In the LTE system, a 10 ms radio frame is divided into two half frames, each of which is partitioned into 10 time slots with a length of 0.5 ms, 2 time slots form one subframe with a length of 1 ms, and one half frame comprises 5 subframes.

For normal cyclic prefixes with lengths of 5.21 µs and 4.69 µs, one time slot comprises 7 uplink/downlink symbols a with length of 66.7 µs, wherein the cyclic prefix (CP) of the first symbol has a length of 5.21 µs, and the CP of the other 6 symbols have a length of 4.69 µs; for the extended CP with a length of 16.67 µs, one time slot comprises 6 uplink/downlink symbols.

A Cell ID can be classified into ID1 and ID2, wherein ID1 denotes the sequence number of a cell group, ID1={0, 1, . . . ,166,167}, ID2 denotes the sequence number of the cell in the cell group, ID2={0, 1, 2}.

In the Orthogonal Frequency Division Multiplexing (OFDM) system, resource can be presented in two dimensions including time and frequency.

FIG. 2 is a schematic diagram showing the downlink pilot location when the CP is a normal CP, wherein 1 denotes the sequence number of an OFDM symbol, T1 denotes the pilot of the first antenna, T2 denotes the pilot of the second antenna, T3 denotes the pilot of the third antenna, T4 denotes the pilot of the fourth antenna.

The frequency domain locations of the downlink pilots are as follows,

The initial location of the pilot on the first antenna is the $k^{th}$ sub-carrier (k=0, 1, 2, 3, 4, 5), the distance between neighboring pilots is 6 sub-carriers, and the pilots are arranged in sequence till the last available sub-carrier of the system; The distance between the initial location of the pilot on the second antenna and the initial location of the pilot on the first antenna are 3, that is to say, the initial location of the pilot on the second antenna is $(k+3)^{th}$ sub-carrier, the distance between the neighboring pilots is also 6 sub-carriers, the pilots are arranged in sequence till the last available sub-carrier of the system;

The pilots on the third antenna have the same pilot frequency domain locations as those of the first antenna, the pilots on the fourth antenna have the same pilot frequency domain locations as those of the second antenna;

The time domain locations of the downlink pilots are as follows,

The pilots of the first antenna and the pilots of the second antenna are transmitted at the first OFDM symbol and the third last OFDM symbol in each time slot of downlink sub-frames, and the pilots of the third antenna and the pilots of the fourth antenna are transmitted at the second OFDM symbol in each time slot of downlink sub-frames, which are shown in FIG. 2.

As described above, the pilot initial location, k, on the first antenna has no relationship with the cell ID, there is no mapping relationship therebetween, thus during the implementation of the system, the pilot location can not be determined, which results in the system can not perform various functions.

SUMMARY OF THE INVENTION

The present invention is directed to provide a method and device for mapping the initial location of downlink pilot, so as to solve the problem that pilot location can not be determined in the prior art.

According to the present invention, a mapping method for the initial position of downlink pilot is provided, which comprises the following steps: acquiring a cell sequence number; mapping the cell sequence number to k; and setting an initial location of the downlink pilot on a first antenna as the $k^{th}$ sub-carrier.

Preferably, the cell sequence number comprises a sequence number ID1 of a cell group to which the cell belongs; mapping the cell sequence number to k comprises mapping ID1 to k.

Preferably, ID1={0,1, . . . ,166,167}, mapping ID1 to k comprises k=(ID1+n)mod 6, wherein, n is selected from {0, 1, 2, 3, 4, 5}.

Preferably, ID1={0,1, . . . ,166,167}, mapping ID1 to k comprises k=(floor(ID1/28)+n)mod 6, wherein, n is selected from {0, 1, 2, 3, 4, 5}.

Preferably, the cell sequence number comprises the sequence number ID1 of the cell group to which the cell belongs and the sequence number ID2 of the cell in the cell group. Mapping the cell sequence number to k comprises mapping ID1 and ID2 to k.

Preferably, ID1={0,1, . . . ,166,167}, ID2={0,1,2}. Mapping ID1 and ID2 to k comprises: k=(floor(ID/17)+n)mod 6, wherein, ID=ID1×3+ID2, n is selected from {0, 1, 2, 3, 4, 5}.

Preferably, ID1={0,1, . . . ,166,167}, ID2={0,1,2}. Mapping ID1 and ID2 to k comprises: k=(ID1 mod 2+ID2×2+n) mod 6, wherein, n is selected from {0, 1, 2, 3, 4, 5}.

Preferably, ID1={0,1, . . . ,166,167}, ID2={0,1,2}. Mapping ID1 and ID2 to k comprises: k=(ID+n)mod 6, wherein, ID=ID1×3+ID2, n is selected from {0, 1, 2, 3, 4, 5}.

According to the present invention, also provided is a mapping device for the initial position of downlink pilot, which comprises: an acquiring module for acquiring a cell sequence number, a mapping module for mapping the cell sequence number to k; and a setting module for setting an initial location of the downlink pilot on a first antenna as the $k^{th}$ sub-carrier.

Preferably, ID1={0,1, . . . ,166,167}, the mapping module is used to map the cell sequence number to k by using one of the following equations: k=(ID1+n)mod 6; k=(floor(ID1/28)+n)mod 6; k=(floor(ID/17)+n)mod 6; k=(ID1 mod 2+ID2×2+n)mod 6; k=(ID+n)mod 6; wherein, ID=ID1×3+ID2, n is selected from {0, 1, 2, 3, 4, 5}; ID1 denotes the sequence number of a cell group to which the cell belongs; ID2 denotes the sequence number of the cell in the cell group.

The method and device for mapping the initial location of downlink pilot according to above embodiment overcomes the problem that the pilot location can not be determined in the prior art, because the cell sequence number is used for mapping the initial location of downlink pilot, thus enable each cell to acquire the specific pilot location, so that all functions of the system can be realized conveniently.

BRIEF DESCRIPTION OF THE DRAWINGS

Drawings are provided for the further understanding of the present invention and form a part of the specification, which are used to explain the present invention with the embodiments of the present invention rather than limit the present invention, wherein.

DETAILED DESCRIPTION OF THE EMBODIMENTS

The embodiments of the present invention will be detailed in connection with drawings.

Figure 1:
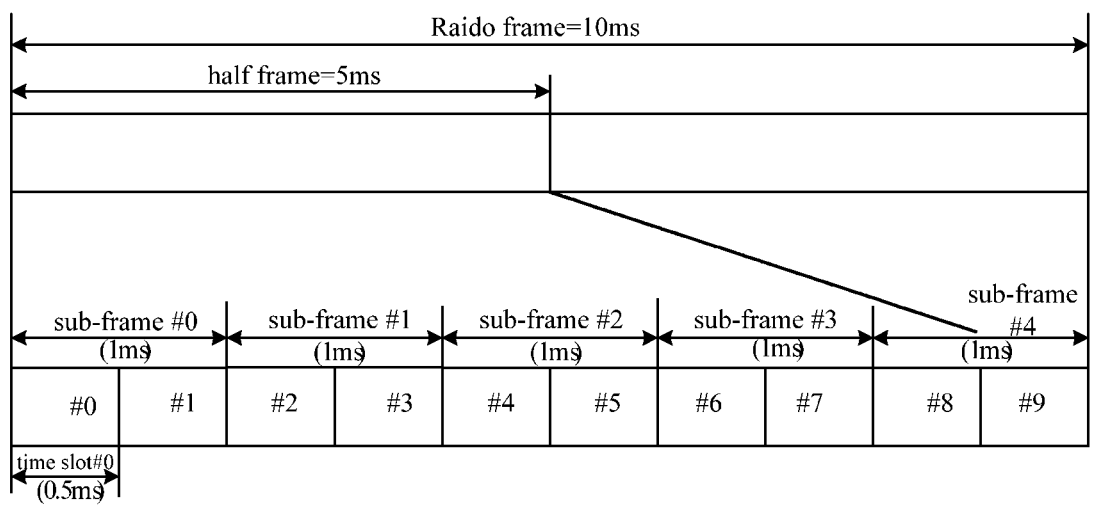
FIG. 1 is a schematic diagram of the frame structure of the LTE system in the TDD mode.
Figure 2:
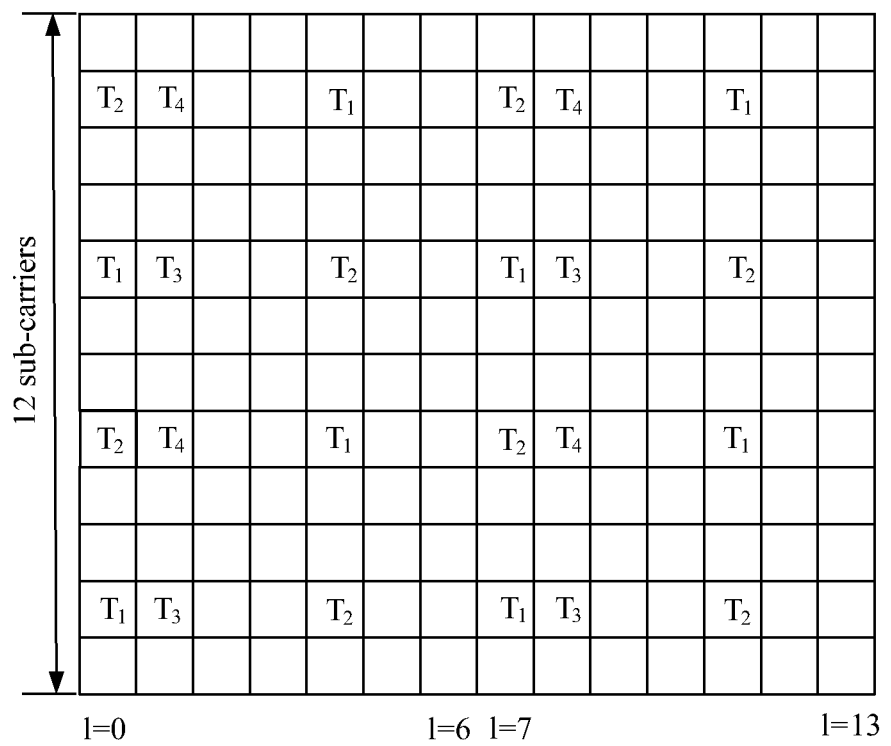
FIG. 2 is a schematic diagram of downlink pilot location when the CP is a normal CP.
Figure 3:
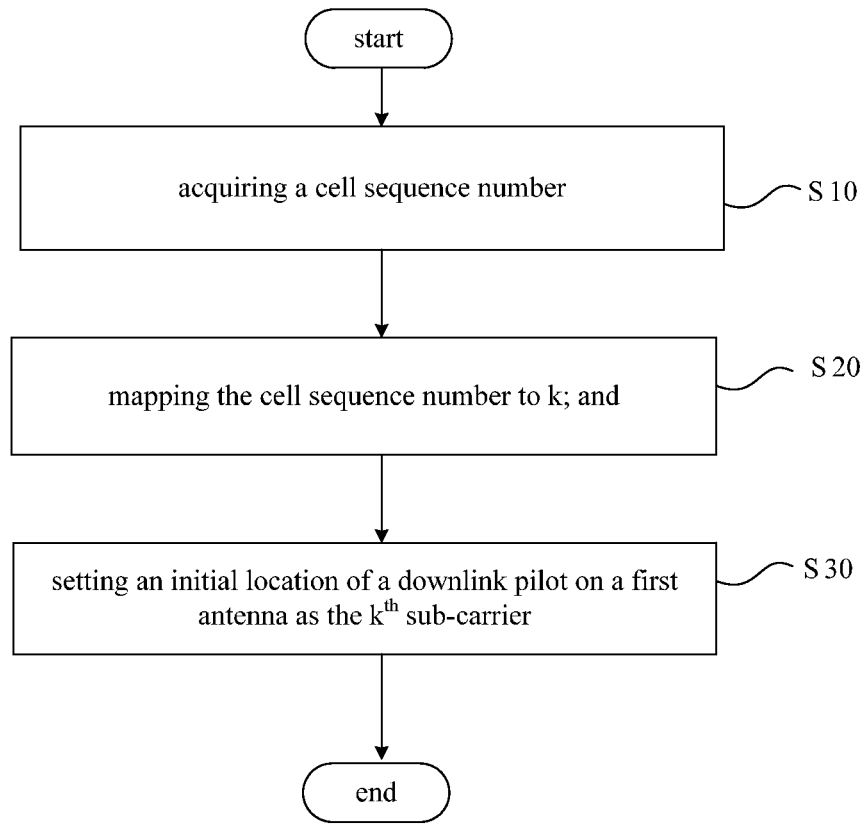
FIG. 3 is a flow chart of method for mapping the initial location of downlink pilot according to an embodiment of the present invention.

FIG. 3 shows the flow chart of a method for mapping the initial location of a downlink pilot according to an embodiment of the present invention, which comprises the following steps:

Step S10, acquiring a cell sequence number;

Step S20, mapping the cell sequence number to k; and

Step S30, setting an initial location of the downlink pilot on a first antenna as the $k^{th}$ sub-carrier.

The above mapping method proposes to map the initial location of downlink pilot using cell sequence number, so as to overcome the problem that the pilot location can not be determined in the prior art, thus enable each cell to acquire specific pilot location, so that all the functions of the system can be realized conveniently.

Preferably, the cell sequence number comprises the sequence number ID1 of a cell group to which the cell belongs; step S20 comprises mapping ID1 to k.

Preferably, ID1={0,1, . . . ,166,167}, mapping ID1 to k comprises k=(ID1+n)mod 6, wherein, n is selected from {0, 1, 2, 3, 4, 5}. Wherein n=0 indicates n is omitted from k=(ID1+n)mod 6, and in the following equations, n=0 implies the same meaning.

Preferably, ID1={0,1, . . . ,166,167}, mapping ID1 to k comprises k=(floor(ID1/28)+n)mod 6, wherein n is selected from {0, 1, 2, 3, 4, 5}. The function floor( ) means floor function, also may be denoted with ⌊ ⌋.

Preferably, the cell sequence number comprises the sequence number ID1 of a cell group to which the cell belongs, and the sequence number ID2 of the cell in the cell group. Step S20 comprises mapping ID1 and ID2 to k.

Preferably, ID1={0,1, . . . ,166,167}, ID2={0,1,2}. Mapping ID1 and ID2 to k comprises: k=(floor(ID/17)+n)mod 6, wherein ID=ID1×3+ID2, n is selected from {0, 1, 2, 3, 4, 5}. Wherein ID can be considered as the cell sequence number.

Preferably, ID1={0,1, . . . ,166,167}, ID2={0,1,2}. Mapping ID1 and ID2 to k comprises: k=(ID1 mod 2+ID2×2+n)mod 6, wherein n is selected from {0, 1, 2, 3, 4, 5}.

Preferably, ID1={0,1, . . . ,166,167}, ID2={0,1,2}. Mapping ID1 and ID2 to k comprises: k=(ID+n)mod 6, wherein ID=ID1×3+ID2, n is selected from {0, 1, 2, 3, 4, 5}.

Above preferred embodiments provide some preferred mapping relationships, which can reasonably maps the cell sequence number to the initial location of downlink pilot.

Figure 4:
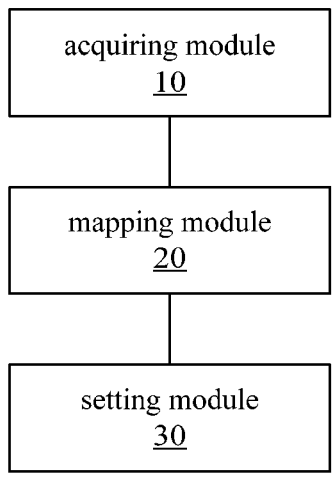
FIG. 4 is a block diagram of the device for mapping the initial location of downlink pilot according to an embodiment of the present invention.

FIG. 4 is a block diagram of the device for mapping the initial location of downlink pilot according to an embodiment of the present invention, which comprises:

a acquiring module 10, which is used to acquire a cell sequence number;

a mapping module 20, which is used to map the cell sequence number to k; and a setting module 30, which is used to set an initial location of a downlink pilot on a first antenna as the $k^{th}$ sub-carrier.

The above mapping method sets forth mapping the initial location of downlink pilot by using cell sequence number, so as to overcome the problem that the pilot location can not be determined in the prior art, thus enable each cell to acquire specific pilot location, so that all the functions of the system can be realized conveniently.

Preferably, ID1={0,1, . . . ,166,167}, the mapping module 20 is used to map cell sequence number to k by using one of the following equations: k=(ID1+n)mod 6; k=(floor(ID1/28)+n)mod 6; k=(floor(ID/17)+n)mod 6; k=(ID1 mod 2+ID2×2+n)mod 6; k=(ID+n)mod 6; wherein, ID=ID1×3+ID2, n is selected from {0, 1, 2, 3, 4, 5}; ID1 denotes the sequence number of a cell group to which the cell belongs; ID2 denotes the sequence number of the cell in the cell group.

Above preferred embodiments provide some preferred mapping relationships, which reasonably map the cell sequence number to the initial location of downlink pilot.

Some embodiments of the present invention are provided hereinafter for further understanding the present invention.

Embodiment 1

It is assumed that cell ID is {0,17,34,51,68,85,102,119, 136,153,170,187}, and k=(floor(ID/17)+n)mod 6 is applied, then the initial location of pilot on the first antenna of each cell is {0,1,2,3,4,5,0,1,2,3,4,5}.

Embodiment 2

It is assumed that cell ID is {0,1,2,3,4,5,6,7,8,9,10,11}, the corresponding cell group ID1 is {0,0,0,1,1,1,2,2,2,3,3,3}, cell ID2 in the cell group is {0,1,2,0,1,2,0,1,2,0,1,2}, k=(ID1 mod 2+ID2×2+n)mod 6 is applied, then the initial location of the pilot on the first antenna of each cell is {0,2,4,1,3,5,0,2, 4,1,3,5}.

Embodiment 3

It is assumed that cell ID is {0,1,2,3,4,5,6,7,8,9,10,11}, and k=(ID+n)mod 6 is applied, then the initial location of pilot on the first antenna of each cell is {0,1,2,3,4,5,0,1,2,3,4,5}.

Embodiment 4

It is assumed that cell ID is {0,1,2,3,4,5,6,7,8,9,10,11}, the corresponding cell group ID1 is {0,0,0,1,1,1,2,2,2,3,3,3}, cell ID2 in the cell group is {0,1,2,0,1,2,0,1,2,0,1,2}, $k=(ID1+n) \mod 6$ is applied, then the initial location of the pilot on the first antenna of each cell is $\{0,0,0,1,1,1,2,2,2,3,3,3\}$.

Embodiment 5

It is assumed that cell ID is $\{0,43,86,126,169,212,252,295,338,378,421,464\}$, the corresponding cell group ID1 is $\{0,14,28,42,56,70,84,98,112,126,140,154\}$, cell ID2 in cell group is $\{0,1,2,0,1,2,0,1,2,0,1,2\}$, $k=(\text{floor}(ID1/28)+n) \mod 6$ is applied, then the initial location of the pilot on the first antenna of each cell is $\{0,1,2,3,4,5,0,1,2,3,4,5\}$.

It can be seen from above description that the mapping method and device for the initial location of downlink pilot according to the above embodiments overcome the problem that the pilot location can not be determined in the prior art, because the cell sequence number is employed to map the initial location of downlink pilot, thus enable each cell to acquire specific pilot location, so that all functions of the system can be realized conveniently.

Obviously, those skilled in the art shall understand that individual modules and steps of the present invention can be implemented with general computation devices integrated together or distributed in the network formed by a plurality of computation devices, alternatively implemented with program codes executable by computation devices, which can be stored in memory devices for execution by the computation devices, or implemented with ICs, or several modules or steps can be implemented with a single IC. Thus, the present invention is not limited to any particular hardware and software combination.

Above description is to illustrate the preferred embodiments not limit the present invention. Various alterations and changes to the present invention are apparent to those skilled in the art. The scope defined in claims shall comprise any modification, equivalent substitution and improvement in the spirit and principle of the present invention.

The invention claimed is:

1. A method for mapping the initial location of a downlink pilot, comprising,
   acquiring a cell sequence number;
   mapping the cell sequence number to k; and
   setting an initial location of the downlink pilot on a first antenna as the $k^{th}$ sub-carrier;
   wherein the cell sequence number comprises a sequence number ID1 of a cell group to which the cell belongs, and mapping the cell sequence number to k comprises: mapping ID1 to k, ID1=$\{0,1,\ldots,166,167\}$, n is selected from $\{0, 1, 2, 3, 4, 5\}$, and mapping ID1 to k comprises $k=(ID1+n) \mod 6$, or, $k=(\text{floor}(ID1/28)+n) \mod 6$; or,
   the cell sequence number comprises a sequence number ID1 of a cell group to which the cell belongs and a sequence number ID2 of the cell in the cell group, and mapping the cell sequence number to k comprises: mapping ID1 and ID2 to k, ID1=$\{0,1,\ldots,166,167\}$, ID2=$\{0,1,2\}$, n is selected from $\{0, 1, 2, 3, 4, 5\}$, $k=(\text{floor}(ID/17)+n) \mod 6$ or $k=(ID1 \mod 2+ID2\times 2+n) \mod 6$ or, $k=(ID+n) \mod 6$ wherein $ID=ID1\times 3+ID2$.

2. A device for mapping the initial position of a downlink pilot, comprising:
   an acquiring module, adapted to acquire a cell sequence number;
   a mapping module, adapted to map the cell sequence number to k; and
   a setting module, adapted to set an initial location of the downlink pilot on a first antenna as the $k^{th}$ sub-carrier;
   wherein the cell sequence number comprises a sequence number ID1 of a cell group to which the cell belongs, ID1=$\{0,1,\ldots,166,167\}$, n is selected from $\{0, 1, 2, 3, 4, 5\}$, and the mapping module is adapted to map the cell sequence number to k by using one of the following: $k=(ID1+n) \mod 6$ or $k=(\text{floor}(ID1/28)+n) \mod 6$;
   or, the cell sequence number comprises a sequence number ID1 of a cell group to which the cell belongs and a sequence number ID2 of the cell in the cell group, ID1=$\{0,1,\ldots,166,167\}$, n is selected from $\{0, 1, 2, 3, 4, 5\}$, and the mapping module is adapted to map the cell sequence number to k by using one of the following: $k=(\text{floor}(ID/17)+n) \mod 6$ or $k=(ID1 \mod 2+ID2\times 2+n) \mod 6$ or $k=(ID+n) \mod 6$, wherein $ID=ID1\times 3+ID2$.

* * * * *

UNITED STATES PATENT AND TRADEMARK OFFICE
CERTIFICATE OF CORRECTION

| | | |
|---|---|---|
| PATENT NO. | : 8,582,605 B2 | Page 1 of 1 |
| APPLICATION NO. | : 12/865079 | |
| DATED | : November 12, 2013 | |
| INVENTOR(S) | : Bo Dai | |

It is certified that error appears in the above-identified patent and that said Letters Patent is hereby corrected as shown below:

On the Title page of the patent, under the heading (73), the city of the Assignee
        "Shenz, Guangdong Province (CN)"
    should be
        --Shenzhen, Guangdong Province (CN)--

Signed and Sealed this
Twenty-eighth Day of January, 2014

Michelle K. Lee
*Deputy Director of the United States Patent and Trademark Office*